United States Patent Office 3,701,651
Patented Oct. 31, 1972

3,701,651
PROCESS FOR PRODUCTION OF MERCURY
Albert G. W. Hack, Denver, and John B. Hamilton, Boulder, Colo., assignors to Al Hack & Associates, Inc., Denver, Colo.
Continuation-in-part of application Ser. No. 707,707, Feb. 23, 1968. This application Feb. 6, 1970, Ser. No. 9,214
Int. Cl. C22b 43/00
U.S. Cl. 75—101 R                4 Claims

ABSTRACT OF THE DISCLOSURE

Metallic mercury is produced by leaching mercury ore with an aqueous alkaline sulfide solution while simultaneously precipitating the mercury by the addition of a metallic precipitant, such as aluminum metal, directly to the leaching tanks, or by electrodeposition directly from the leaching tanks.

CROSS REFERENCE TO RELATED APPLICATION

This application is a continuation-in-part of our co-pending application Ser. No. 707,707, filed Feb. 23, 1968, now abandoned.

BACKGROUND OF THE INVENTION

The present invention relates to the hydrometallurgy of mercury ores. More particularly, the invention relates to a new and improved hydrometallurgical process for producing mercury from a mercury ore such as the sulfied ore cinnabar, the oxide ore Montroydite, the chloride ore calomel, or other mercury ores and mercury bearing compounds.

In U.S. Pat. No. 1,119,377, issued Dec. 1, 1914, to Edwin B. Thornhill for "Process for Extraction of Mercury from its Ores and Other Materials," there is described a hydrometallurgical process for the recovery of mercury. In this process, mercury ore is ground and extracted with a sodium sulfide solution to produce a pregnant liquor. This liquor is filtered and brought into contact with a metallic substance, such as aluminum, which precipitates the mercury. A related process is described in U.S. Pat. No. 1,774,883, issued Sept. 2, 1930, to Walter Glaeser, for "Method of Producing Mercury."

A comprehensive and detailed discussion of the hydrometallurgy of mercury sulfide ores is presented by John N. Butler in a report entitled "Studies in the Hydrometallurgy of Mercury Sulfide Ores," Nevada Bureau of Mines Report 5, Mackay School of Mines, University of Nevada, 1963. This report describes the chemistry of the process and presents the results of extensive investigations to determine process conditions and costs.

In the prior art process for producing mercury by chemical leaching and precipitation, as described by Butler, Thornhill, and Glaeser, the leaching steps are carried out first, followed by separation of the mercury rich pregnant liquor from the spent ore. The pregnant liquor is filtered, and the mercury is precipitated from the liquor by adding aluminum or other metallic precipitant to the liquor. Following precipitation, the spent or barren liquor is regenerated and reused as the leaching solution.

OBJECTS OF THE INVENTION

It is the principal object of the present invention to increase the efficiency and yield of the hydrometallurgical process for the recovery of mercury.

A related object is to reduce the overall cost of the process by reducing the capital requirements, process time and process costs.

Another object of the invention is to eliminate or substantially reduce the loss of mercury and thereby increase the process yield.

A further object of the invention is to provide a process having the foregoing attributes even when used on mine-run mercury bearing ores.

SUMMARY

The present invention accomplishes the foregoing objects by combining the step of leaching mercury ore in an aqueous alkaline sodium sulfide solution, with the step of precipitating mercury from the solution by means of aluminum or other appropriate precipitant, into a single step operation in which leaching and precipitation are accomplished simultaneously and in the same reaction tank.

DESCRIPTION OF THE PREFERRED EMBODIMENT

Figure 1:
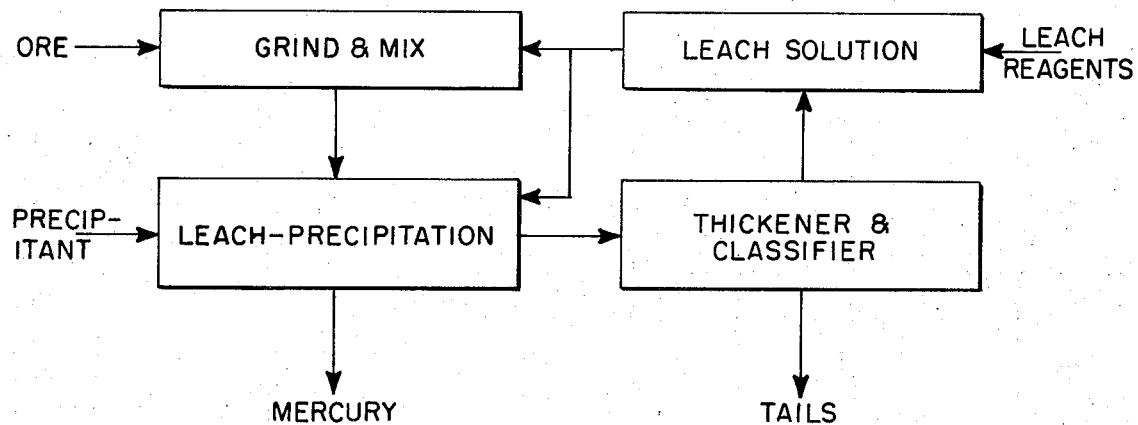
FIG. 1 is a block flow diagram of a process for recovery of mercury according to the present invention.

The steps of the process embodying the present invention are illustrated schematically in FIG. 1, and comprise generally the grinding and mixing of the ore with a portion of a leaching solution to form a slurry. This ore slurry is then mixed with the balance of the leaching solution and a precipitant, such as aluminum metal for the combination leach precipitation step. Metallic mercury is removed from the leach precipitation step, while the tails are separated from the spent leach solution in a thickener-classifier stage. The spent or barren leach solution is recycled to the leach solution preparation stage where it is regenerated by mixing with fresh leach reaction reagents. The tails are discarded.

Figure 2:
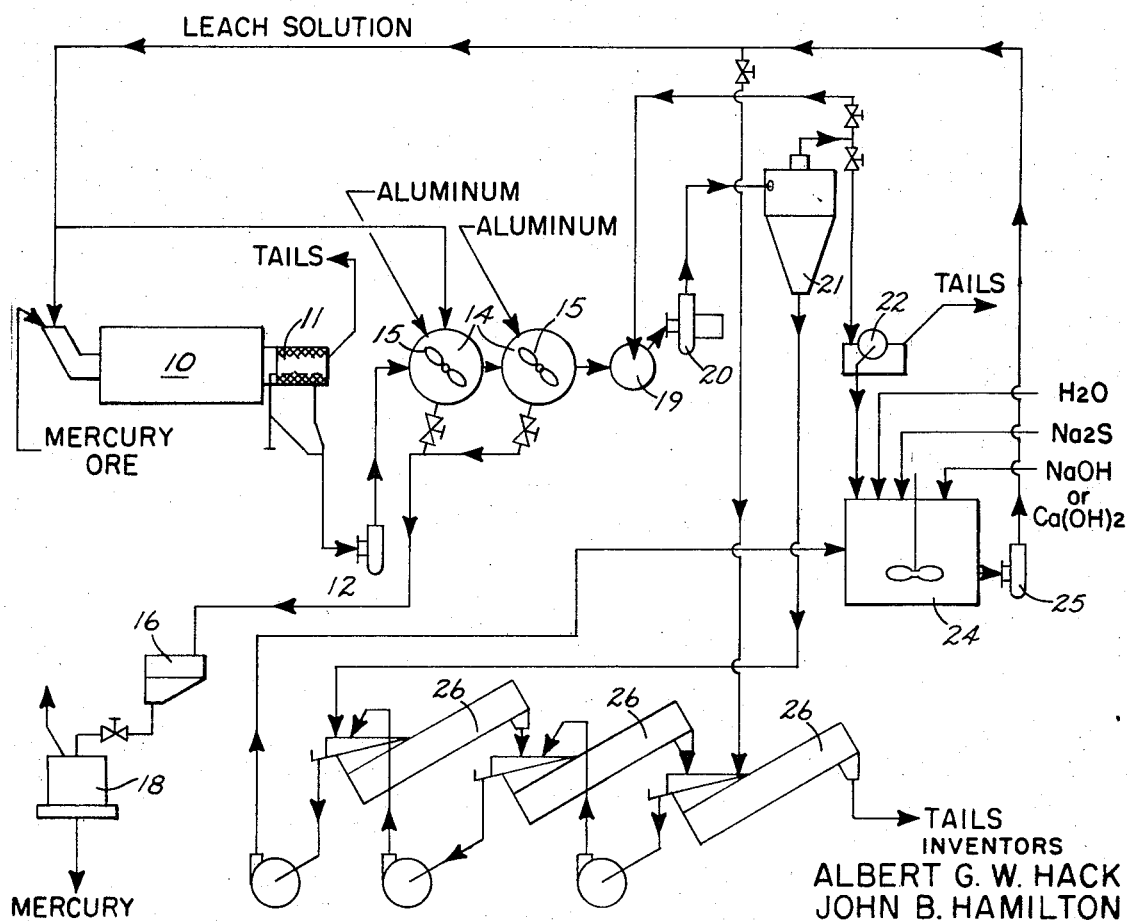
FIG. 2 is a more detailed schematic flow diagram of a hydrometallurgical process for recovery of mercury according to the present invention.

Referring more specifically to the schematic flow diagrams shown in FIG. 2 of the drawings, a mercury bearing or, such as cinnabar, is mixed with a sodium sulfide and calcium or sodium hydroxide leaching solution in a drum or rod mill 10 to insure thorough wetting of the ground ore. Any large chunks of ore or foreign matter are screened out by a discharge screen 11, and the slurry of ground ore and leaching solution is fed by a pump 12 to series of reaction tanks 14. Each reaction tank 14 contains a power driven agitator 15. A sufficient number of tanks 14 are utilized to provide the desired holding time for the completion of the reaction, usually about six to ten hours. The leaching solution acts on the ore to dissolve the mercury sulfide contained therein.

Along with the ore and leaching solution, a precipitant such as granulated aluminum, antimony, or other suitable precipitant, is added directly to the reaction tanks 14. This substance, such as aluminum, reacts with the mercury compound as it is dissolved to precipitate metallic mercury. When aluminum metal is used, for example, it dissolves as a soluble sodium alumium oxide or sodium aluminate.

Metallic mercury is recovered by drawing metallic mercury from the bottom of the reaction tanks 14 through any suitable valve structure. Any gold or other precious metal which is present in the free state in the ore will be recovered as an amalgam. The recovered metal is collected in a holding tank 16. Aluminum and other metals are separated from the mercury by filtering the mercury through a suitable filter in a filter tank 18, and metallic mercury is collected as the final product. If the residue contains gold or other valuable metal, it may be recovered in any suitable manner. Aluminum collected in the filter 18 may be recycled to the reaction tanks 14. As pointed out above, one or more reaction tanks 14 are utilized in series depending upon the capacity of each tank, the quantity of materials used in the process and the holding time desired. The leach liquor is separated from the spent ore and returned to the circuit in any suitable manner. One illustrative method for doing this is shown in the flow diagram of the drawing. To this end, the over-flow from the last tank 14 in the series, constituting a slurry of spent ore particles in barren leach liquor, flows into a surge tank 19. From the surge tank 19, the slurry is pumped by a pump 20 to a cyclone separator 21, in which a preliminary separation of solids and liquid is accomplished.

Barren leach solution is withdrawn from the cyclone separator 21. A portion of this solution may be fed back to the surge tank 19 if necessary to maintain the desired liquid level therein. The bulk of the barren leach solution is filtered by a filter 22 from which any solid tails are removed and discarded. The barren leach liquor is then mixed in a holding tank 24 with sodium sulfide, sodium hydroxide or calcium hydroxide, and water to adjust its strength to the desired proportions, and is then recirculated by a pump 25 to the drum or rod mill 10.

The solids-rich portion from the cyclone separator 21 is fed to a series of classifiers 26 in which the solid tails are separated from the liquid. A portion of the leaching solution from the holding tank 24 is used as a wash liquor to wash the tails. Was liquor from the classifiers 26 is returned to the holding tank 24, as shown in FIG. 2, or alternatively may be returned to the surge tank 19.

A brief description of the chemical reactions which take place in the hydrometallurgical recovery of mercury from mercury sulfide ores is given by Butler in the above-described publication. These basic chemical reactions are highly complex, but expressed in a simplified form are believed to be as follows:

Mercury sulfide dissolves in a sodium sulfide solution:

$$HgS+Na_2S=HgS \cdot Na_2S \text{ (solution)} \qquad (1)$$

Mercury is precipitated from the solution by the addition of a metallic precipitant such as aluminum metal:

$$3(HgS \cdot Na_2S)+8NaOH+2Al$$
$$=3Hg+6Na_2S+2NaAlO_2+4H_2O \qquad (2)$$

The above reactions (1) and (2) are carried out in an aqueous alkaline solution. Sodium sulfide in water hydrolyzes, according to the reaction $$Na_2S+H_2O \rightleftharpoons NaHS+NaOH \qquad (3)$$

Since sodium hydrosulfide (NaHS) is not a solvent for mercury sulfide (cinnabar), sodium hydroxide is added to the leach liquor to prevent hydrolysis, as indicated in reaction (3), from taking place. This is especially true for dilute solutions, where hydrolysis would otherwise be virtually complete. When calcium hydroxide is added to the leach liquor in place of the sodium hydroxide, to produce an alkaline solution, the reaction is substantially the same as given in Equation 2 above, except that an insoluble calcium aluminate is precipitated and removed with the spent ore tailings.

Theoretically 1 pound of aluminum should precipitate 11 pounds of mercury, but this high ratio has not been reached in practice for the following reasons:

(a) Aluminum is consumed by the free sodium hydroxide according to the equation:

$$2Al+2NaOH+2H_2O=2NaAlO_2+3H_2 \qquad (4)$$

or:

$$2Al+6NaOH=2Na_3AlO_3+3H_2 \qquad (5)$$

(b) Aluminum will be consumed by any antimony which may have been dissolved, and the antimony will be precipitated as a fine metallic powder. It may either amalgamate with the mercury, or float on top of the mercury, in which case it can be separated by filtration.

From Equation 2 it will be seen that the sodium sulfide is not only released from the double sulfide $$(HgS \cdot Na_2S)$$

but that additional sodium sulfide is generated. Theoretically, for every pound of sodium sulfide used to dissolve cinnabar, 2 pounds will be available after precipitating the mercury with aluminum metal. In the treatment of ores this theoretical condition will never be attained because any arsenic or antimony sulfides, limonite, or iron from the grinding media in the circuit will consume sodium sulfide. In an ore high in mercury and low in the other sodium-sulfide consumers, however, it is possible to have a build-up of sodium sulfide.

The basic chemical equations for the leaching of mercury oxide ore (Montroydite) are believed to be as follows:

$$HgO+Na_2S+H_2O=HgS+2NaOH \qquad (6)$$
$$HgS+Na_2S=HgS \cdot Na_2S \text{ (Solution)} \qquad (1)$$

Combining the two above reactions:

$$HgO+2Na_2S+H_2O=HgS \cdot Na_2S+2NaOH \qquad (7)$$

From this point the precipitation reaction continues as shown in Equation 2 above.

The basic chemical equations for the leaching of mercury chloride ore (Calomel) are believed to be as follows:

$$2HgCl+Na_2S+H_2O=HgS+2NaCl+Hg+H_2O \qquad (8)$$
$$HgS+Na_2S=HgS \cdot Na_2S \text{ (Solution)} \qquad (1)$$

Combining the two above reactions:

$$2HgCl+2Na_2S+H_2O$$
$$=HgS \cdot Na_2S+2NaCl+Hg+H_2O \qquad (9)$$

It should be noted that half the mercury is precipitated in reaction (9), and the remaining mercury will be precipitated by aluminum as in Equation 2, which follows the step shown in Equation 9.

In using aluminum to effect the precipitation of mercury, sodium hydroxide is consumed both in the precipitation reaction of Equation 2 and by direct reaction with aluminum. A partial regeneration of sodium hydroxide can be made by adding hydrated lime to the barren solution, to convert soluble sodium aluminate to insoluble calcium aluminate and sodium hydroxide. The reaction is:

$$2NaAlO_2+Ca(OH)_2+Ca(AlO_2)_2+2NaOH \qquad (10)$$

The insoluble calcium aluminate will be removed with the leach tailings.

The following examples illustrate the present invention:

EXAMPLE I

Ore—Cinnabar sample from the Terlingua, Texas, District.
Assay—40 lbs. mercury per ton (2%).
Sample size—400 grams (containing 8 grams mercury).
Leaching solution—700 milliliters, containing 120 grams of sodium sulfide and 40 grams of sodium hydroxide per liter of aqueous solution.
Precipitant—3 grams granulated aluminum, approximately No. 8 mesh.

Procedure

The ore sample was ground to −65 mesh and placed in a ½ gallon container. The leaching solution was added, and the pulp agitated by a 2" impellor, at approximately 200 r.p.m.

The granulated aluminum was then added, and the agitation was allowed to proceed for 8 hours. At the end of this time, the agitator was turned off, and the tails separated from the mercury by decanting. The mercury was weighed at 7.6 grams, evidencing a 95% recovery of mercury from the ore.

EXAMPLE II

Ore—Cinnabar sample from the Tybo, Nevada, District.
Assay—4.8 lbs. mercury per ton (0.24%).
Sample size—200 grams (containing 0.48 gram mercury).
Leaching solution—600 milliliters, containing 80 grams of sodium sulfide and 2 grams of calcium hydroxide per liter of aqueous solution.
Precipitant—0.5 gram granulated aluminum of a particle size from about −35 mesh to about −14 mesh.

Procedure

The ore sample was ground to −35 mesh and placed in a ½ gallon container. The leaching solution was added, and the pulp agitated by a 2″ impellor, at approximately 200 r.p.m.

The granulated aluminum was then added, and the agitation was allowed to proceed for 6 hours. At the end of this time, the agitator was turned off, and the tails separated from the mercury by decanting. The mercury weighed 0.4584 gram, evidencing a 95.5% recovery of mercury from the ore.

EXAMPLE III

Ore—Cinnabar sample from the Tybo, Nevada, District.
Assay—3.6 lbs. mercury per ton (0.18%).
Sample size—200 grams (containing 0.36 gram mercury).
Leaching solution—600 milliliters, containing 80 grams of sodium sulfide and 20 grams of sodium hydroxide per liter of aqueous solution.
Precipitant—0.5 gram granulated aluminum, −35 mesh to −14 mesh.

Procedure

The ore sample was ground to −35 mesh and placed in a ½ gallon container. The leaching solution was added, and the pulp agitated by a 2″ impellor at approximately 200 r.p.m.

The granulated aluminum was then added, and the agitation was allowed to proceed for 2 hours. At the end of this time the agitator was turned off, and the tails separated from the mercury by decanting. The mercury weighed 0.3419 gram, evidencing a 95% recovery of mercury from the ore.

EXAMPLE IV

Ore—Artificial sample, prepared from mercury oxide and silica sand, to simulate Montroydite.
Assay—46.3 lbs. mercury per ton (2.32%).
Sample size—200 grams (containing 4.63 grams mercury).
Leaching solution—600 millliters, 40 grams sodium sulfide in saturated solution of calcium hydroxide.
Precipitant—1.5 grams granulated aluminum, approximate −35 mesh.

Procedure

The ore sample, at approximately −65 mesh, was placed in a ½ gallon container. Leaching solution and granulated aluminum were added, and the pulp agitated by a 2″ impellor at approximately 200 r.p.m. Agitation was allowed to proceed for 6 hours. At the end of this time the agitator was turned off and the tails separated from the mercury by decanting. The mercury was weighed at 4.49 grams, evidencing a 97% recovery of mercury from the ore.

EXAMPLE V

Ore—Artificial sample, prepared from mercury chloride and silica sand, to simulate natural calomel.
Assay—42.4 lbs mercury per ton (2.12%).
Sample size—200 grams (containing 4.24 grams mercury).

The leaching solution, precipitant and procedure were the same as described in Example IV. The mercury recovered was weighed at 4.13 grams, evidencing a 97.5% recovery of mercury from the ore.

As a further modification of the process embodying the present invention, metallic mercury can be produced in the reaction tanks 14 by utilizing electrolytic means. To this end, appropriate electrodes are inserted into the reaction tanks. Metallic mercury is recovered and filtered. In other respects the process is similar to the process described above.

With the foregoing process, as contrasted to the prior art processes, there is no handling of the pregnant liquor, as would be required in a filtration stage prior to precipitation, and thus the possibility of losing this liquor, and most important the mercury it contains, is eliminated. There is no requirement that the pregnant liquor be separated from the spent ore. On the contrary, all the separating steps are carried out with barren liquor and spent ore. As a further important advantage, free mercury, which is often present in the ground ore, will be trapped and recovered without the use of any additional equipment. The free mercury will either be absorbed by the mercury precipitated in the reaction tanks 14, or will amalgamate with the precipitant and be recovered in the filter 18.

Another advantage observed with the present process is the reduction in overall process time, since reaction times of leaching and precipitation are combined into essentially the same time period previously required for precipitation alone. Also, the process time is reduced by elimination of the necessity of washing spent ore to collect all pregnant liquor.

While an illustrative process embodying the present invention has been shown in the drawing and described above in considerable detail, it should be understood that there is no intention to limit the invention to the specific embodiment disclosed. On the contrary, the intention is to cover all modifications, alternative procedures, equivalents and uses of the present invention as may fall within the spirit and scope of the appended claims.

We claim:

1. The hydrometallurgical process of extracting metallic mercury from cinnabar ore comprising the steps of:
   forming a slurry of finely divided ore in an aqueous alkaline leaching solution of sodium sulfide and an hydroxide selected from the group consisting of sodium hydroxide and calcium hydroxide and mixtures thereof to produce a leaching reaction between said ore and said leaching solution for leaching mercury from said ore;
   adding a metallic aluminum precipitant to said slurry prior to the completion of the leaching solution;
   agitating said slurry in the presence of said precipitant to effect leaching of mercury compounds from said ore with substantially simultaneous precipitation of metallic mercury; and
   separating metallic mercury from said slurry.

2. The process of extracting metallic mercury as defined in claim 1 including the further steps of separating the leaching solution from said slurry and recycling at least a portion of said leaching solution to form additional slurry with additional ore; and
   separating excess precipitant from said metallic mercury and recycling at least a portion of said excess precipitant to said additional slurry.

3. The process of extracting metallic mercury as defined in claim 1 wherein said sodium sulfide, sodium hydroxide and calcium hydroxide are employed in aqueous solution, and metallic aluminum precipitant is added, all in stoichiometric proportions sufficient to substantially completely precipitate as metallic mercury the mercury content of the ore subjected to extraction.

4. The process of extracting metallic mercury as defined in claim 3 wherein the metallic mercury is recovered by gravity separation from said slurry and precipitant mixture.

References Cited

UNITED STATES PATENTS

| | | | |
|---|---|---|---|
| 1,119,377 | 12/1914 | Thornhill | 75—121 |
| 1,774,883 | 9/1930 | Glaeser | 75—121 X |
| 1,762,861 | 6/1930 | Glaeser | 75—121 |
| 3,476,552 | 11/1969 | Parks et al. | 75—101 |
| 980,364 | 1/1911 | Szilard | 204—105 R |
| 1,402,742 | 1/1922 | Codding | 75—121 |
| 3,361,559 | 1/1968 | Town | 75—109 |
| 1,718,103 | 6/1929 | Baxter | 204—105 |

GEORGE T. OZAKI, Primary Examiner

U.S. Cl. X.R.

75—109, 121; 204—105

UNITED STATES PATENT OFFICE
CERTIFICATE OF CORRECTION

Patent No. 3,701,651    Dated October 31, 1972

Inventor(s) Albert G. W. Hack and John B. Hamilton

It is certified that error appears in the above-identified patent and that said Letters Patent are hereby corrected as shown below:

Col. 2, line 42, "or" should read --ore--

Col. 3, line 29, "Was" should read --Wash--

Col. 4, line 8, "in" should read --ing--

Col. 4, line 48, the equation (10) should read $$\text{--}2NaAlO_2 + Ca(OH)_2 = Ca(AlO_2)_2 + 2NaOH\text{--}$$

Signed and sealed this 10th day of April 1973.

(SEAL)
Attest:

EDWARD M. FLETCHER, JR.         ROBERT GOTTSCHALK
Attesting Officer               Commissioner of Patents